(12) United States Patent
Boulanger et al.

(10) Patent No.: US 9,019,123 B2
(45) Date of Patent: Apr. 28, 2015

(54) HEALTH CHECK SERVICES FOR WEB-BASED COLLABORATION ENVIRONMENTS

(75) Inventors: Antoine Boulanger, San Francisco, CA (US); Tomas Barreto, Menlo Park, CA (US); Vignesh Sukumar, Belmont, CA (US); Sam Ghods, San Francisco, CA (US)

(73) Assignee: Box, Inc., Los Altos, CA (US)

( * ) Notice: Subject to any disclaimer, the term of this patent is extended or adjusted under 35 U.S.C. 154(b) by 318 days.

(21) Appl. No.: 13/464,813

(22) Filed: May 4, 2012

(65) Prior Publication Data

US 2013/0162444 A1    Jun. 27, 2013

Related U.S. Application Data

(60) Provisional application No. 61/579,551, filed on Dec. 22, 2011.

(51) Int. Cl.
*G08C 15/06* (2006.01)
*G08C 19/20* (2006.01)
*H04Q 9/00* (2006.01)

(52) U.S. Cl.
CPC .............. *H04Q 9/00* (2013.01); *H04Q 2209/43* (2013.01)

(58) Field of Classification Search
CPC .. G06Q 10/10; G06F 9/5072; H04L 67/1095; H04L 67/22
USPC ............. 340/870.03; 709/223, 224, 225, 229; 714/1
See application file for complete search history.

(56) References Cited

U.S. PATENT DOCUMENTS

| | | | |
|---|---|---|---|
| 5,787,175 | A | 7/1998 | Carter |
| 5,799,320 | A | 8/1998 | Klug |
| 5,848,415 | A | 12/1998 | Guck |
| 5,864,870 | A | 1/1999 | Guck |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

International Search Report and Written Opinion for PCT/US2008/012973 dated Apr. 30, 2009, pp. 1-11.

(Continued)

*Primary Examiner* — John A Tweel, Jr.
(74) *Attorney, Agent, or Firm* — Perkins Coie LLP

(57) ABSTRACT

System and method for monitoring the health of modules in a web-based collaboration environment are disclosed. In one aspect, embodiments of the present disclosure include a system having one or more host servers configured to receive client requests, process the client requests to determine one or more data items, select one or more modules having the one or more data items stored thereon, and responsively transfer one or more queries requesting availability of the one or more modules. The system also includes one or more health monitoring servers configured to receive the one or more queries, identify the availability of the one or more modules, and send one or more responses to the one or more queries indicating the availability of the one or more modules. The one or more health monitoring servers are configured to periodically determine the availability status of the one or more modules.

28 Claims, 13 Drawing Sheets

(56) References Cited

U.S. PATENT DOCUMENTS

| | | | |
|---|---|---|---|
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 * | 3/2006 | Goodman et al. ............ 709/223 |
| 7,039,806 B1 | 5/2006 | Friedman et al. |
| 7,069,393 B2 | 6/2006 | Miyata et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 * | 1/2007 | Pouyoul et al. ............... 709/225 |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |

(56) References Cited

U.S. PATENT DOCUMENTS

| | | |
|---|---|---|
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0091763 A1 | 4/2008 | Devonshire et al. |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0047413 A1 | 2/2011 | McGill et al. |

(56) References Cited

U.S. PATENT DOCUMENTS

| | | |
|---|---|---|
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0092055 A1 | 4/2012 | Peschke et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |

(56) References Cited

FOREIGN PATENT DOCUMENTS

| | | |
|---|---|---|
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |

OTHER PUBLICATIONS

Supplementary European Search Report European Application No. EP 08 85 8563 dated Jun. 20, 2011 pp. 1-5.
International Search Report and Written Opinion for PCT/US2011/039126 mailed on Oct. 6, 2011, pp. 1-13.
Partial International Search Report for PCT/US2011/041308 dated Feb. 27, 2012, pp. 1-2.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
International Search Report and Written Opinion for PCT/US2011/060875 Mailed Oct. 30, 2012, pp. 1-10.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/034765, Applicant: Box, Inc., Mailed Jan. 20, 2014, 15 pages.
International Search Report and Written Opinion for PCT/US2013/039782, Applicant: Box, Inc., Mailed Aug. 28, 2013, 15 pages.
Patent Court Document of Approved Judgment for GB0602349.3 and GB0623571.7; Mar. 3, 2009, 17 pages.
Exam Report for EP13185269.1, Applicant: Box, Inc. Mailed Jan. 28, 7 pages.
Exam Report for GB1314771.5, Applicant: Box, Inc. Mailed Feb. 17, 2014, 7 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. Mailed Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1312264.3, Applicant: Box, Inc. Mailed Mar. 24, 2014, 7 pages.
Search Report for EP14153783.7, Applicant: Box, Inc. Mailed Mar. 24, 2014, 7 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Sommerer, "Presentable Document Format: Improved On-demand PDF to HTML Conversion," retrieved from the internet, http://research.microsoft.com, 8 pages.

(56) References Cited

OTHER PUBLICATIONS

Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. Mailed Apr. 15, 2014, 12 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"Microsoft Office SharePoint 2007 User Guide," Feb. 16, 2010, pp. 1-48.
"Understanding Metadata," National Information Standards Organization, NISO Press, 2004, 20 pages.
International Search Report and Written Opinion for PCT/US2010/070366, Applicant: Box, Inc., Mailed Mar. 24, 2013, 10 pages.
International Search Report and Written Opinion for PCT/US2011/047530, Applicant: Box, Inc., Mailed Mar. 22, 2013, pp. 1-10.
International Search Report and Written Opinion for PCT/US2011/057938, Applicant: Box, Inc., Mailed Mar. 29, 2013, 10 pages.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
Lars, "35 Very Useful Online Tools for Improving your project Management and Team Collaboration," Apr. 31, 2010, tripwiremagazine.com, pp. 1-32.
Parr, "Google Docs Improves Commenting, Adds E-mail Notifications," Apr. 16, 2011, mashable.com, pp. 1-6.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WOWO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.

\* cited by examiner

HEALTH CHECK SERVICES FOR WEB-BASED COLLABORATION ENVIRONMENTS

CROSS-REFERENCE TO RELATED APPLICATIONS

This application claims the benefit of U.S. Provisional Patent Application No. 61/579,551 entitled "MODULE STATUS MONITORING USING HEALTH CHECK SERVICES", which was filed on Dec. 22, 2011, the contents of which are all incorporated by reference herein.

BACKGROUND

As electronic and digital content being used in enterprise settings or other organizations as the preferred mechanism for project, task, and work flow management has increased, so has the need for streamlined collaboration and sharing of digital content and documents. In such a collaboration environment, multiple users are sharing, accessing, and otherwise performing actions or tasks on content and files in a shared work space. This shared access requires high availability of the data (e.g., an unfettered ability to download and upload files) as any number of users may have access to a given file or may want to or need to perform an action on the file at any given time.

To improve availability, the content and/or files within a shared work space may reside within one or more modules (e.g., storage systems) in the collaboration environment. Various backup or replicated modules on which the data resides can be used to access the data in the event that an original (or primary) module is unavailable. The backup or replicated modules can serve the users until the original module has recovered. Unfortunately, the current systems for identifying a failed or failing module and switching between the failed module and a working module require administer intervention and introduce additional latency in client response times. Administrator intervention can result in system downtime where the data is temporary unavailable. Accordingly, enhanced health monitoring, as disclosed herein, can promote maximum data availability in web-based collaboration environments.

DETAILED DESCRIPTION

Figure 1:
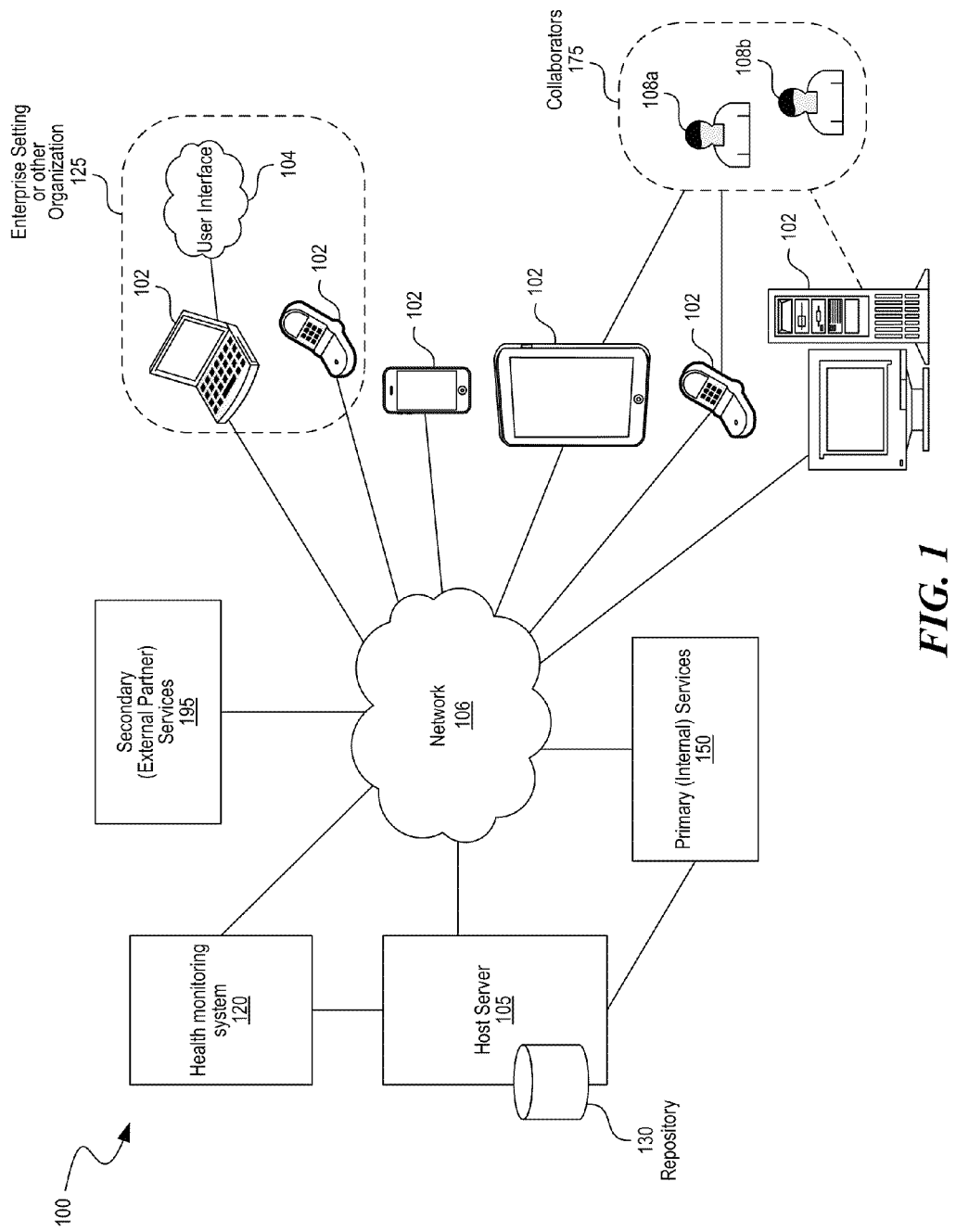
FIG. 1 illustrates an example diagram of a system having a health check service or monitoring system able to check the service systems in a web-based collaboration environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Prior art systems have focused on checking the health or monitoring systems configurations each time a client request is received at a host or front-end system. Performing this type of monitoring can increase response times impacting overall system performance. Further, manual administrator intervention is typically required to switch between failed modules resulting in system downtime and unavailability of services described herein. The systems and methods described herein provide for automatic monitoring and switching between modules in a web-based collaboration environment resulting in improved system availability.

In one embodiment, a health monitoring service is disclosed that monitors internal modules (e.g., storage systems in a data center) as well as external modules (e.g., existing storage service systems such as, for example, the Amazon S3 service). The overall system leverages the existing or external services to provide a seamless web-based collaboration environment with enhanced availability.

Embodiments of the present disclosure include systems and methods for enhanced module health monitoring in web-based collaboration environments.

FIG. 1 illustrates an example diagram of a web-based collaboration environment 100 having monitoring system 120 able to check the health of primary data services system 150 and a second data services system 195. In one embodiment, the services provided at the primary services system 150 and the secondary system 195 are redundant to provide maximum availability in the event that one of the services systems is unavailable. Client devices 102 can access the services by way of the host server 105.

The client devices 102 can be any system and/or device, and/or any combination of devices/systems that is able to establish a connection, including wired, wireless, cellular connections with another device, a server and/or other systems such as host server 105 and/or the primary services system 150. Client devices 102 will typically include a display and/or other output functionalities to present information and data exchanged between among the devices 102 and/or the host server 105.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.)), Windows-based OS (Windows Mobile, Windows 7, etc.), Android, Blackberry OS, Embedded Linux platforms, Palm OS, or Symbian platform.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 105).

The collaboration platform or environment 100 hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, real-time services, databases, database items, etc. A workspace can generally refer to any grouping of a set of digital content in the collaboration platform 100. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such that each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
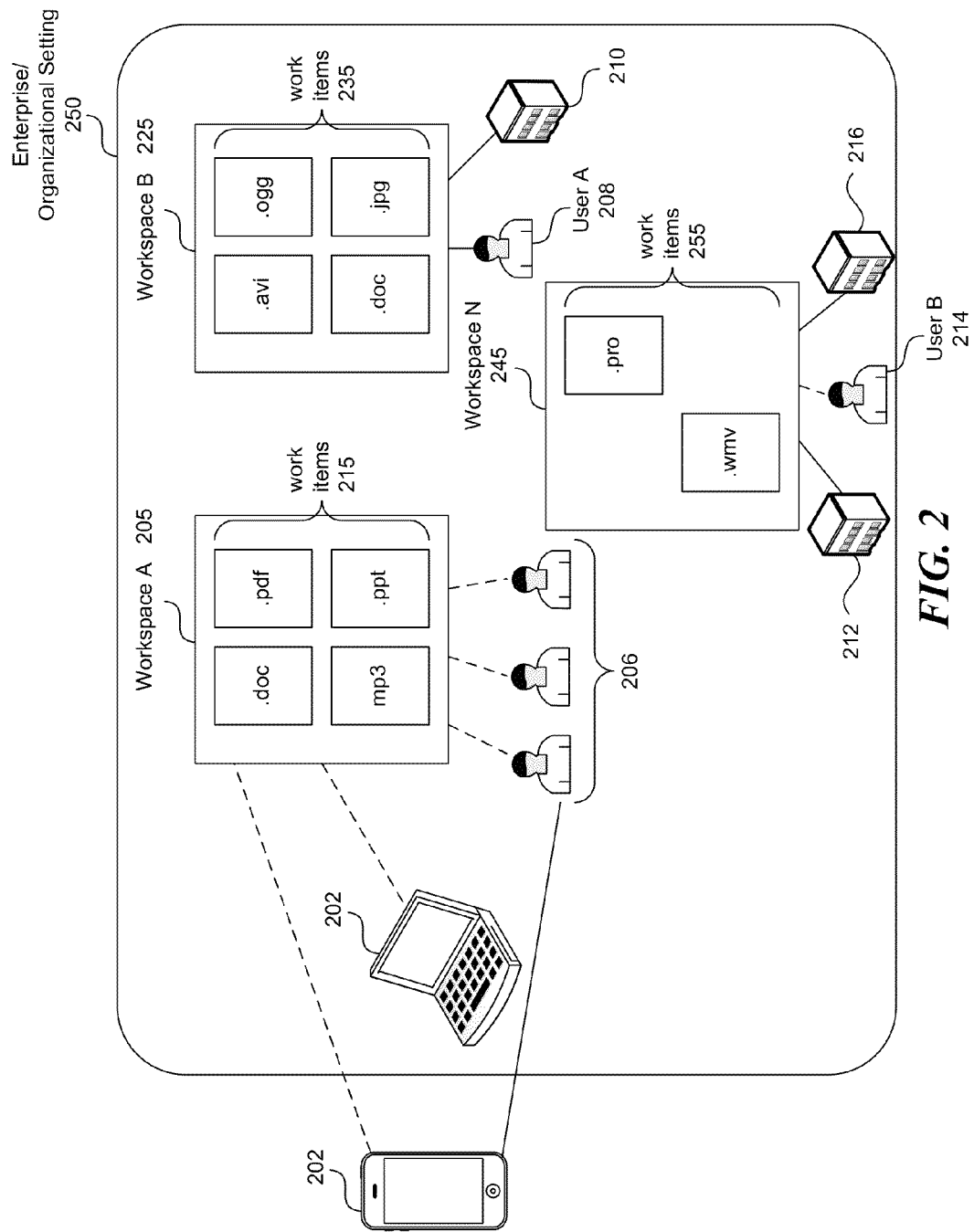
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

As discussed, the collaboration platform or environment 100 hosts workspaces with work items that one or more users can access redundantly across multiple storage nodes. For example, in one embodiment, the primary data services system 150 and a second data services system 195 can each comprise one or more storage nodes. In this case, the services provided are storage services (i.e., storing the work items). In one embodiment, the primary data services system 150 comprises a clustered storage system having a plurality of storage nodes. In some cases, to increase availability, the plurality of storage nodes may redundantly replicate the work items across the storage nodes using technology such as, for example, a redundant array of inexpensive disks (RAID). However, in the event of a total failure of the primary data services system 150, the work items are inaccessible to the clients 102. Accordingly, the secondary system 195 provides external storage services to the collaboration environment 100. The work items or services are also redundantly replicated to the secondary system 195 so that the secondary system 195 is used for downloading and uploading the work items in the event of a failure of the primary data service system 150.

In one embodiment, the monitoring system 120 monitors the availability status or health of various modules or systems in the collaboration environment 100. For example, the monitoring system 120 can periodically monitor the availability status of the primary data services system 150 and a second data services system 195. Alternatively or additionally, the monitoring system 120 can monitor the availability status of one or more individual storage servers or storage nodes in the primary data services system 150. Thus, if one or more of the storage nodes or the entire primary data services system 150 is inaccessible, the monitoring system 120 can identify the node or data center and mark the state of the system as unavailable or unhealthy ("OFF"). The one or more individual storage nodes and/or primary data services system 150 and/or the secondary system 195 can be unavailable if, for example, the node or data center goes down (e.g., loses connectivity, power, etc.).

In one embodiment, in order to monitor the modules, the monitoring system 120 generates requests to access one or more of the modules. If the storage node does not respond, or if the response is too slow, the monitoring system can mark the storage node or system as unavailable. More detailed examples of the monitoring system 120 are discussed with reference to FIGS. 4A-4C.

In one embodiment, client devices 102 communicate with the host server 105 over network 106. As shown, host server 105 also communicates with the primary data services system 150 and a second data services system 195 over network 106. In general, network 106, over which the client devices 102, the host server 105, and/or the primary data services system 150 and a second data services system 195 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 105 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
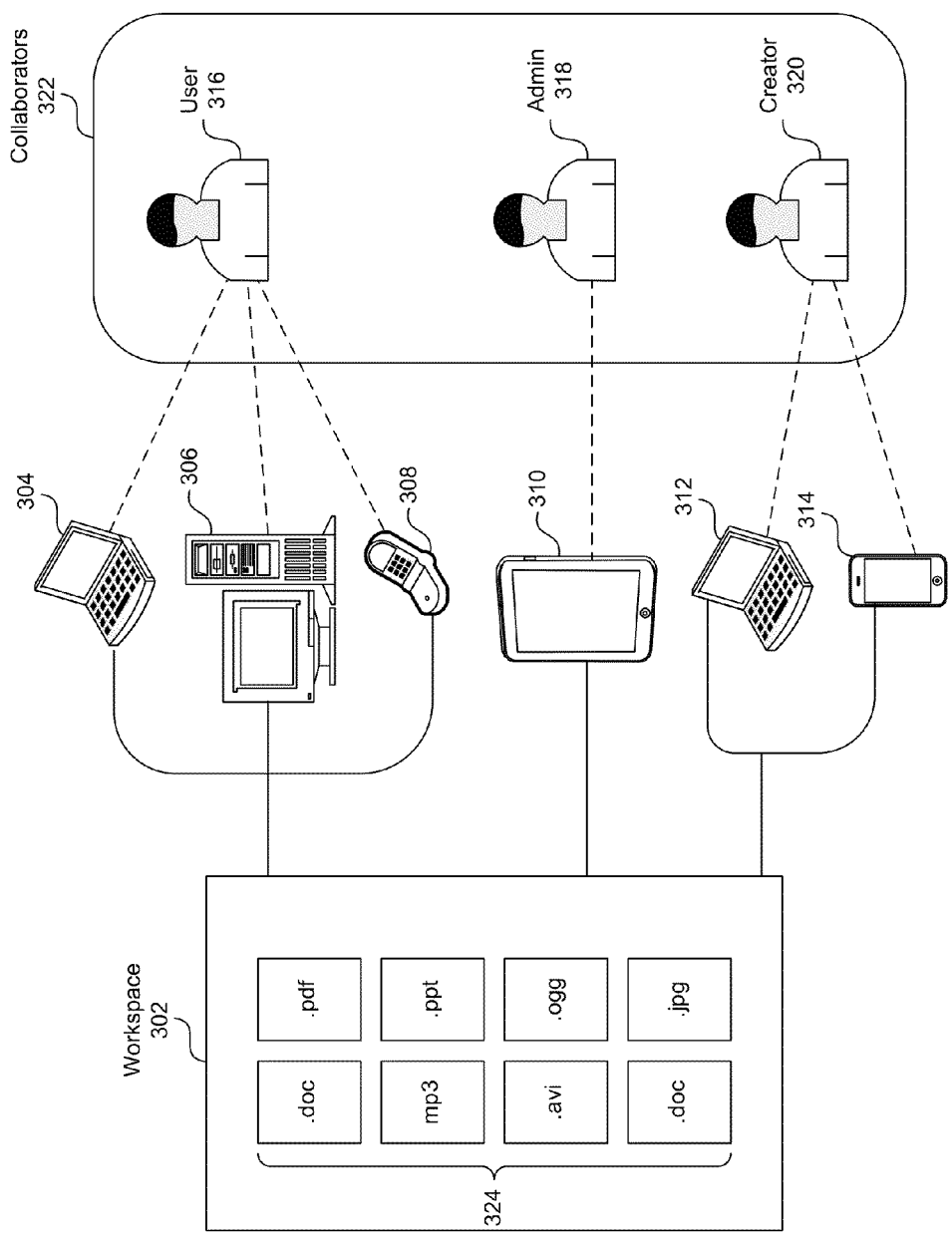
FIG. 3 depicts an example diagram of a workspace in an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., cloud-based environment 100 of FIG. 1), each user can access the work items 324 anytime, and from any physical location using any device (e.g., including devices they own or any shared/public/loaner device).

Work items to be edited or viewed can be accessed from the workspace 302 in accordance with the platform and/or application independent mechanisms disclosed herein. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Figure 4A:
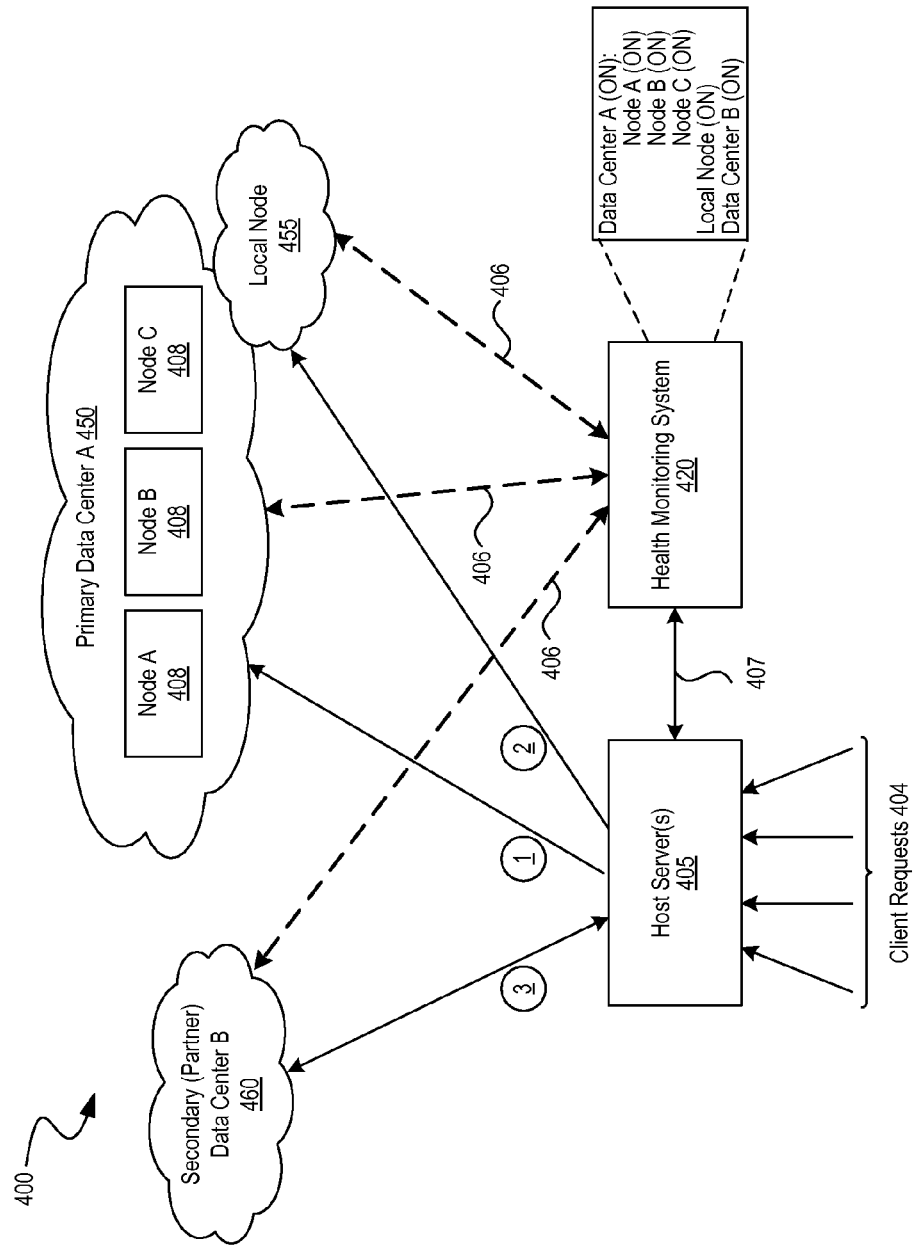
FIGS. 4A-4C depict block diagrams illustrating examples of a health check service or monitoring system able to check the service systems in a web-based collaboration environment.
Figure 4B:
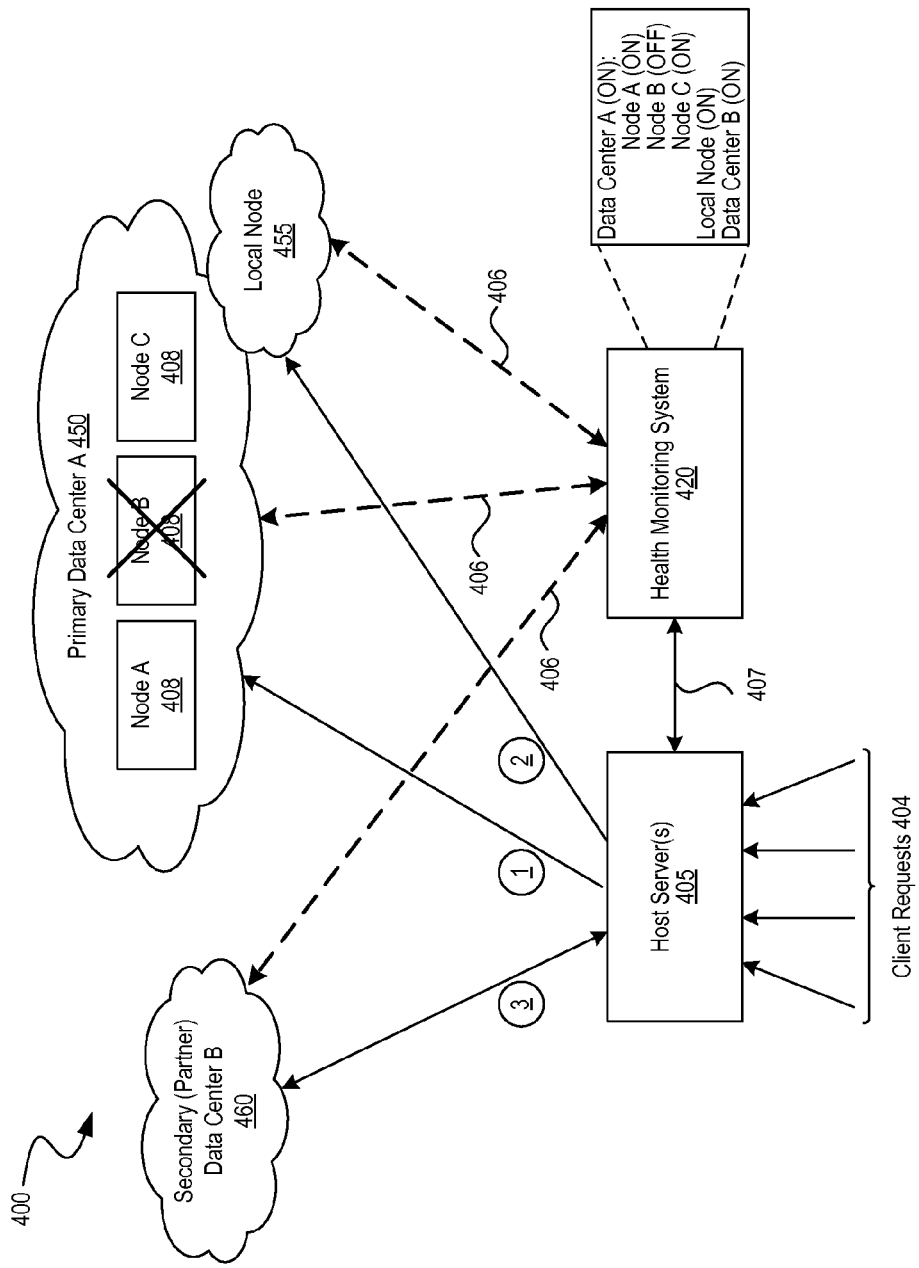
Figure 4C:
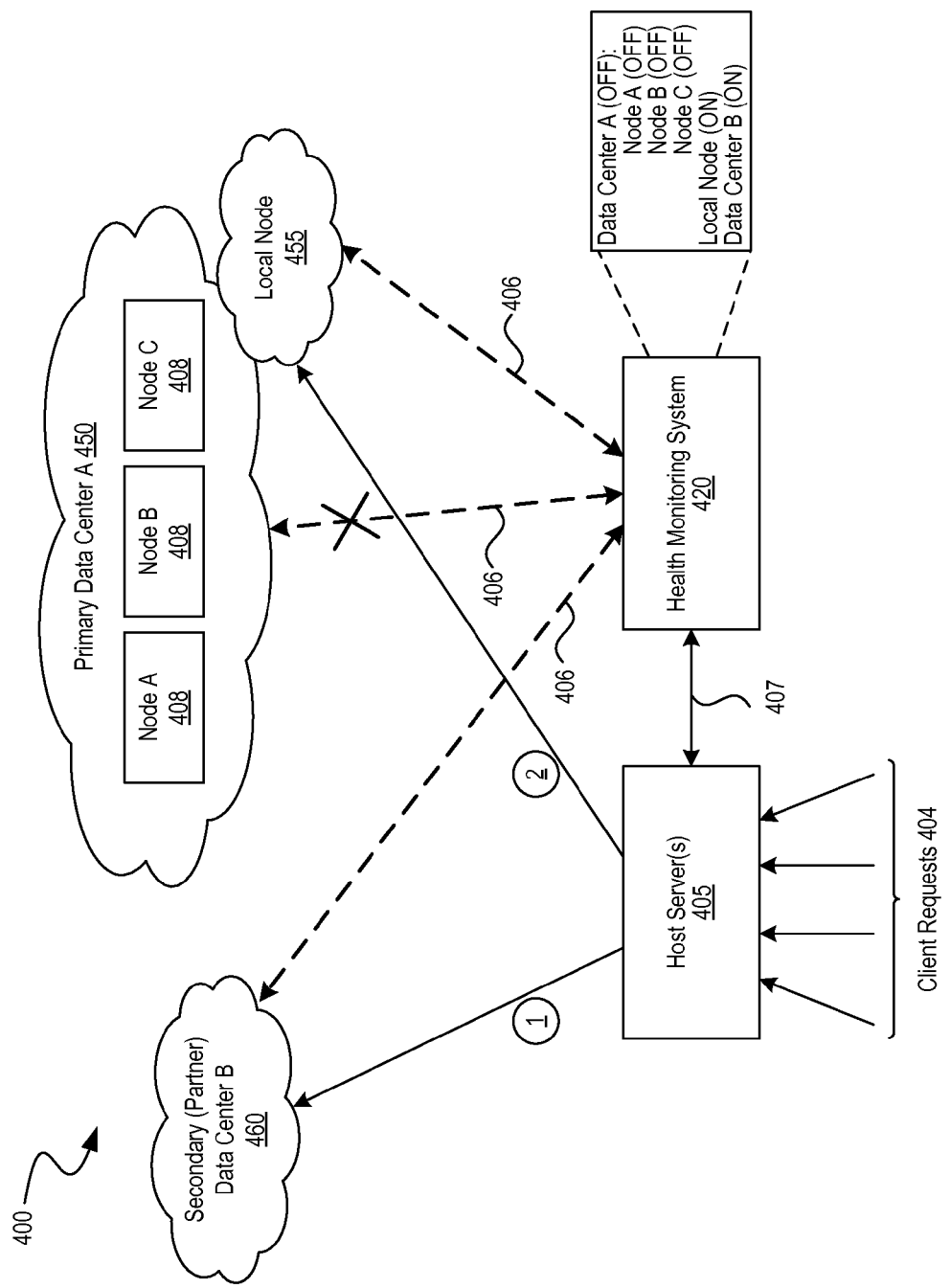

FIGS. 4A-4C depict block diagrams illustrating examples of a health monitoring system 420 able to check the health of service systems in a web-based collaboration environment 400, according to an embodiment. The web-based collaboration environment 400 can be the web-based collaboration environment 100 of FIG. 1, although alternative configurations are possible.

Referring first to FIG. 4A, which depicts a web-based collaboration environment 400 including one or more host servers 405, a health monitoring system 420, a primary data center A 450, a local node 455, and a secondary (partner) data center B 460. As shown, in steps 1, 2, and 3, data directed to the web-based collaboration environment 400 from clients (i.e., client write or modification requests 404) is stored in three physical locations (i.e., the primary data center A 450, the local node 455, and the secondary (partner) data center B 460). The health monitoring system 420 periodically checks the availability status or health of the primary data center A 450, the local node 455, and the secondary (partner) data center B 460 to ensure that the systems are available.

As shown in the example of FIGS. 4A-4C, the primary data center A 450 comprises a data center that includes storage nodes 408 A, B, and C. It is appreciated that the primary data center A 450 may include any number of nodes. In some embodiments, the local node 455 can comprise a temporary storage node used to redundantly store data directed to a node in the primary data center (see step 2). The temporary local node 455 may be co-located at the same facility as the primary data center A 450; however, the local node 455 can also be co-located at another different facility and/or with one or more host servers 405. The secondary (partner) data center B 460 can be a storage service provided by a partner. The secondary (partner) data center B 460 can include a plurality of nodes; however, in one or more embodiments, the health monitoring system 420 and the one or more host systems 405 see the secondary (partner) data center B 460 as a black box and thus, cannot determine the individual availability status of any modules or storage systems stored thereon. The secondary (partner) data center B 460 may be a storage service such as, for example, Amazon Simple Storage Service (Amazon S3).

A storage node (or storage system) can include a storage server and/or a storage subsystem such as, for example, one or more disk arrays. A storage server is a computer system that is used to store and retrieve data on behalf of one or more clients on a network. In this case, the clients on the network are the host servers 405. A storage server typically operates on behalf of one or more clients to store and manage data in a storage subsystem. The storage subsystem may include a set of mass storage devices, such as magnetic or optical storage-based disks or tapes, flash memories, and/or any mass memory devices. In conventional network storage systems, the mass storage devices can be organized into one or more groups of drives (e.g., redundant array of inexpensive drives (RAID)). In this example, the nodes 408 can be configured to service file-level requests from host servers 405, as in the case of file servers used in a network attached storage (NAS) environment. Alternatively or additionally, the nodes 408 can be configured to service block-level requests from host servers 405, as done by storage servers used in a storage area network (SAN) environment.

The health monitoring system 420 provides the health or availability status of the one or more host servers 405 upon request and/or in response to other events or scenarios so that the one or more host systems 405 can appropriately respond to client requests 404. More specifically, the one or more host servers 405 are able to automatically determine, with information from the health monitoring system 420, whether specific storage servers (nodes) or services are up and running and select the storage servers or nodes appropriately.

In one embodiment, the host server 405 is configured to receive client request 404 from clients such as, for example, clients 102 of FIG. 1. The client requests 404 identify a file or work item that is stored on (or to be stored on) one or more of the storage nodes. Upon receiving the client request 404, if the client request 404 is an access request, the host server 405 selects a node or storage server from a pool or group of storage servers or nodes that have the file or work item stored thereon. Alternatively, if the file is to be stored in the system, the host server 405 identifies and selects a first appropriate storage node that will be used to upload the file or work item identified by the client request 404. In this case, the storage node may be selected based on loading of the storage nodes, physical locations of the storage nodes, or any other property of the system.

Once selected, the host server 405 queries the health monitoring system 420 via communication link 407 to determine the availability status of the selected storage node(s). In the example of FIG. 4A, all of the modules (e.g., nodes, data centers, etc.) are available). Accordingly, each monitored data center and node is set to an "ON" status. As discussed above, the health monitoring system 420 periodically checks the availability status of a plurality of storage nodes and/or data centers. Communication links 406 illustrate the path of the monitoring communication. If the selected node 408 is available (set to "ON"), then the host server 105 can access the node to upload or download a file or work item. However, if the storage node is unavailable, as shown in FIG. 4B, the host server 105 may attempt to access a different storage node or, in the case where the entire primary data center is inaccessible, as shown in FIG. 4C, the host server 105 accesses the backup or secondary (partner) data center B.

FIG. 4B depicts the web-based collaboration environment 400 according to an example wherein node B 408 within the primary data center A 450 is inaccessible. The health monitoring system 420 may determine that node B 408 is inaccessible if, for example, the response time from node B 408 exceeds a threshold. As discussed, if the health monitoring system 420 determines that a node is unavailable, then the health monitoring system 420 sets the availability status of that node to "OFF." In this example, other nodes (i.e., nodes 408A and C) can temporarily takeover responsibility for node B while the node recovers. As shown, in steps 1, 2, and 3, data directed to the web-based collaboration environment 400 from clients (i.e., client write or modification requests 404) is stored in three physical locations (i.e., the primary data center A 450, the local node 455, and the secondary (partner) data center B 460).

FIG. 4C depicts the web-based collaboration environment 400 according to an example wherein the communication link 406 to the primary data center A 450 is broken and thus, the primary data center A 450 is inaccessible. As shown, in steps 1 and 2, data directed to the web-based collaboration environment 400 from clients (i.e., client write or modification requests 404) is stored in only two physical locations (i.e., the local node 455 and the secondary (partner) data center B 460). In some embodiments, the local node 455 may also be unavailable. Once the broken communication link 406 to the primary data center A 450 is restored, the system will heal the nodes in the primary data center (e.g., bring the data up-to-date) and subsequently respond to queries from the health monitoring system 420.

Figure 5:
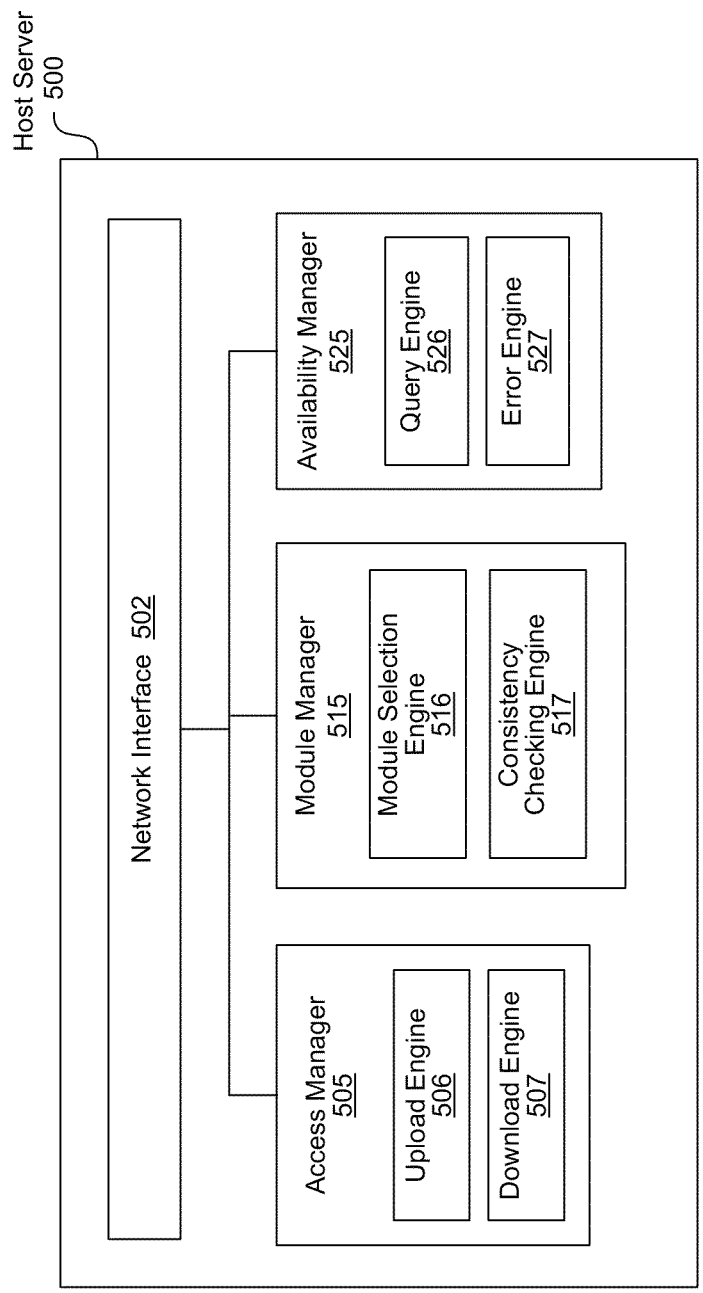
FIG. 5 depicts a block diagram illustrating an example of components in a host server able to interact with a health check service or monitoring system in a web-based collaboration environment.

FIG. 5 depicts a block diagram illustrating an example of components in a host server 500 able to interact with a health check service or monitoring system in a web-based collaboration environment, according to an embodiment.

The host server 500 of the web-based or online collaboration environment can generally be a cloud-based service or a front-end or web server of a cloud based service. The host server 500 can include, for example, a network interface 502, an access manager 505, a module manager 515, and/or an availability manager 525. The access manager 505 can include an upload engine 506 and/or a download engine 507. The module manager 515 can further include a module selection engine 516 and/or a consistency checking engine 517. The availability manager can further include a query engine 526 and/or an error manager 527. Additional or less components/modules/engines can be included in the host server 500 and each illustrated component.

The network interface 502 can be a networking module that enables the host server 500 to mediate data in a network with an entity that is external to the host server 500, through any known and/or convenient communications protocol supported by the host and the external entity. The network interface 502 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. §101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 500 includes the access manager 505. The access manager 505 receives client requests, identifies the required service(s), and controls access to the various modules providing those service(s) for serving the received requests. The various modules may be for example, the primary data services system 150, the temporary repository or node 130, and a second data services system 195 of FIG. 1. As discussed, the access manager 505 is configured to determine whether the received client requests are read requests or write requests. If the received client request is a read request, the download engine 507 reads the data or otherwise accesses the service from a selected module. However, if the received client request is a write request, the upload engine 506 uploads the changes to the file or otherwise makes modifications to the service(s) at multiple modules, if those modules are available. For example, in the case of write requests the host server 500 may make modifications to a service which can be provided from a primary data services system, a temporary repository or node, and a second (external) data services system 195.

One embodiment of the host server 500 includes the module manager 515 which generally selects and switches between modules based on availability determined by the availability manager 525. For example, if a primary data center is down the module is responsible for automatically selecting and switching the selected module to a secondary data center (e.g., an Amazon S3 service). In addition, if one of the modules (or storage servers) within the primary data center is down then the module manager 515 selects a different module and ensures that module is available. The module manager 515 may then temporarily select modules from a different pool or group of modules giving the downed module or storage server time to recover. Accordingly, all access requests that would have gone to the downed module will now be directed to another available module within the data center and/or a secondary data center service (e.g., Amazon S3).

The module manager 515 includes a module selection engine 516. In the case of read requests, the module selection engine 516 is configured to select a module (or multiple modules in the case of write requests) from a pool or group of modules that have the identified service (e.g., file, work item, or real-time service) stored thereon. In one embodiment, in the case of write requests, the module selection engine 516 selects a single module from a group of modules that are part of a primary data service system, and also writes to (selects) the temporary module and the external data service system such as, for example, the Amazon S3 service. The module selection engine 516 can select the appropriate module based on any number of factors such as, for example, the load of the various nodes on which the required service, file, or work item is stored. Other factors may include, but are not limited to, module response time, system preferences, geographical locations, and/or any other property of the system.

The module manager 515 also includes a consistency checking engine 517. The consistency checking engine 517 works in conjunction with the access manager 505 to ensure that the data uploaded and/or downloaded to/from the data centers is accurate. For example, in one embodiment, after writing a file to a storage server in a collaboration platform or environment, the access manager 505 may confirm that the file is transferred properly by confirming the size of the transferred file. The size of a file can be confirmed in some cases by reading meta-data from the module onto which the file was written.

In other embodiments, the consistency checking engine 517 may perform a checksum on a file. A checksum is a fixed-size datum computed from an arbitrary block of digital data for the purpose of detecting accidental errors that may have been introduced during its transmission or storage. The integrity of the data can be checked at any later time by recomputing the checksum and comparing it with the stored one. If the checksums match, the data were almost certainly not altered (either intentionally or unintentionally). The checksum may be used for deduping in some embodiments. For example, if ten users upload the same file, only one file may be stored.

One embodiment of the host server 500 includes the availability manager 525. The availability manager 525 includes a query engine 526 and an error engine 527. The query engine 526 may generate queries to, and process responses from, a health monitoring system to determine the availability status of various modules within the web-based collaboration environment. In one embodiment, each query identifies one or more of the selected modules. The query engine 526 may generate and send a query responsive to each received client request allowing the host server 500 to bifurcate or offload the monitoring responsibilities. Alternatively or additionally, the query engine 526 may intelligently send a query for a number of client requests received within a specific time frame.

The error engine 527 is configured to identify a failure in the health monitoring system and fall back to monitoring system in which the host server 500 checks the availability of the file or work item from an application running on a module in response to each of the client requests. This provides greater granularity but also increases overhead and reduces scalability because of the additional latency added to each client request. In some embodiments, the error engine 527 may be configured to automatically switch back to using the health monitoring system once the health monitor recovers.

Figure 6:
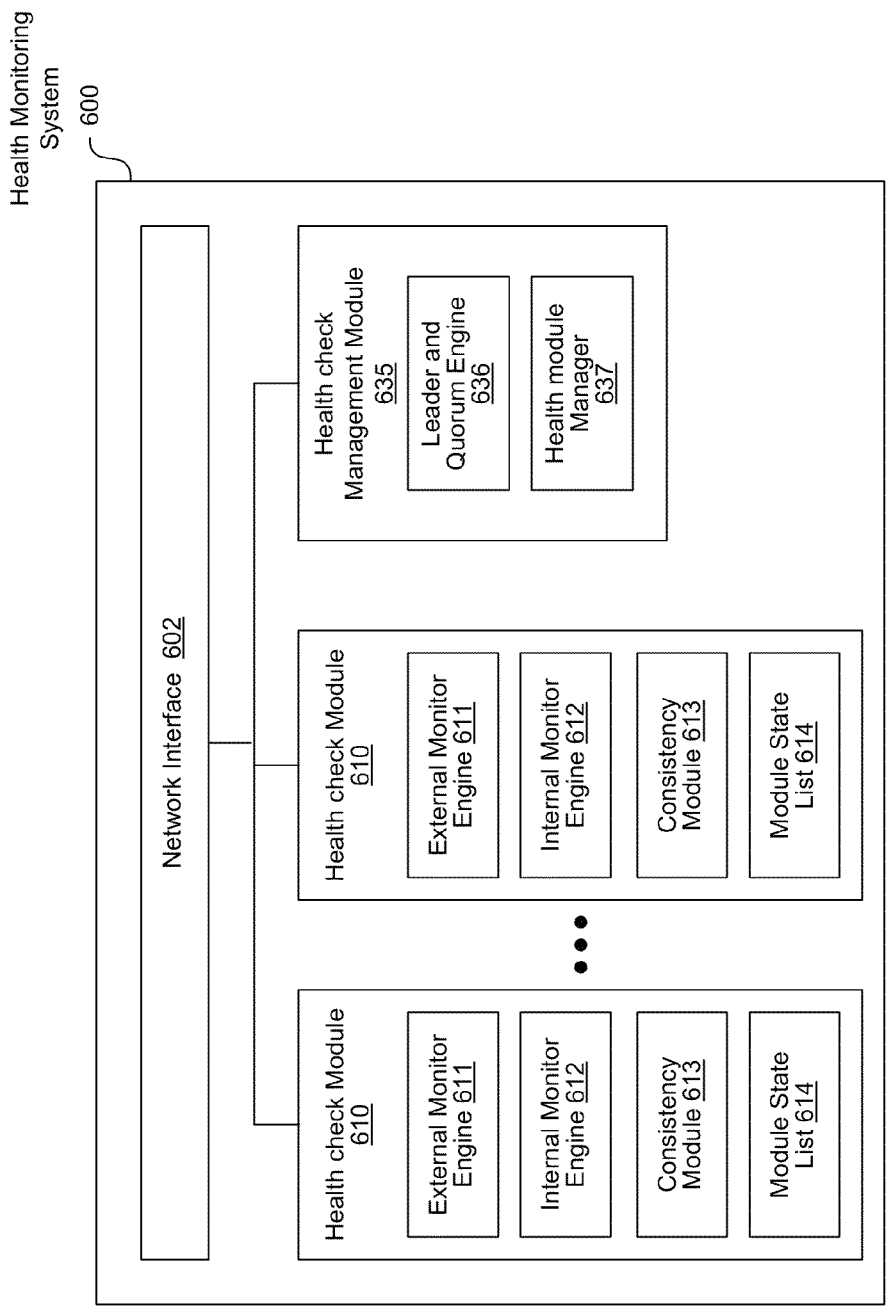
FIG. 6 depicts a block diagram illustrating an example of components in a health check service or monitoring system able to check the service systems in a web-based collaboration environment in a web-based collaboration environment.

FIG. 6 depicts a block diagram illustrating an example of components in a health monitoring system 600 able to check the health of service systems in a web-based collaboration environment, according to an embodiment. The health monitoring system 600 can be any computer system or server, or group of computer systems and/or servers that are configured to monitor modules in a cloud-based service. As discussed the modules may be, but are not limited to, storage systems or services, real-time services, and/or database services. Further, in one or more embodiments, the health monitoring system 600 may be physically and/or logically distributed.

The health monitoring system 600 can include, for example, a network interface 602, one or more health check modules 610, and a health check management module 635. The health check modules 610 can further include an external monitor engine 611, an internal monitor engine 612, a consistency module 613, and/or a module state list 614. The health check management module 535 can further include a leader and quorum engine 536 and/or a health module manager 537. Additional or less components/modules/engines can be included in the host server 500 and each illustrated component.

The network interface 602 can be a networking module that enables the health monitoring system 600 to monitor the health of various modules or entities that are external to the health monitoring system 600 in a web-based collaboration environment, through any known and/or convenient communications protocol supported by the health monitoring system 600 and the external entities. The network interface 602 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

One embodiment of the health monitoring system 600 includes the one or more health check modules 610. The health check modules 610 can include an external monitor engine 611, an internal monitor engine 612, a consistency module 613, and/or a module state list 614. The external monitor engine 611 and the internal monitor engine 612 are configured to monitor or poll the availability status or health of external services such as, for example, Amazon S3, and one or more internally managed data centers or modules, respectively. In one embodiment, monitoring or checking the availability status or health of the external services and internal data center(s) is triggered by one or more system timers. Advantageously, the system timer(s) may be configured to check the availability status with a frequency or rate high enough to establish reliability but lower than the rate at which the health monitoring system 600 receives availability status queries from the one or more host servers. In one example, the external monitor engine 611 and the internal monitor engine 612 may generate faux file store requests, store the files on the module or storage server being monitored and subsequently request the file from the module or storage server.

The consistency module 613 compares the stored file or work item against the received file or work item to determine whether the files are equivalent. In one embodiment, the module state list 614 can be updated to indicate that the files are equivalent. For example, if the files are equivalent then the availability status of the module may be set to "ON." Conversely, if the files are not equivalent then the availability status may be set to "OFF." In addition to the equivalency or consistency check, the availability status may also take into account the response time. For example, in some instances the availability status may be represented numerically (e.g., on a scale of 1 to 5 where 5 is the most available, 1 is the least available and 0 is unavailable). This availability status can be provided to the one or more host servers to be used in selecting accessible modules.

In one embodiment, the module state list 614 may also timestamp states of the modules so that the health monitoring system and/or one or more host servers can fall back to module (e.g., server) configuration files that are known to be good. The configuration files, or config files, configure the initial settings for some computer programs. For example, the configuration files can be used for user applications, server processes and operating system settings, etc.

In one embodiment, Apache ZooKeeper™ can be used by the health check modules 610 to manage the various module states. ZooKeeper™ is a centralized service for maintaining configuration information, naming, providing distributed synchronization, and providing group services. These services are typically used by distributed applications. Advantageously, ZooKeeper™ includes ordering properties that enable events that change the state of the module to be processed in the order they occurred. Thus, a module that changes from an "ON" state to an "OFF" state and quickly back to an "ON" state will have the proper "ON" status stored within the health check module 610. It is appreciated that although that any configuration service can be used that maintains event ordering properties.

One embodiment of the health monitoring system 600 includes the health check management module 635. The health check management module 635 can further include a leader and quorum engine 636 configured to identify a leader among the plurality of health check modules 510 and/or determine a quorum of the availability status determinations made by the plurality of health check modules 610. The health module manager 537 can switch between the health check modules 610 in the event that one or more of the health check modules 610 fails. The health module manager 637 is configured to facilitate the ordered or fast failing of the failfast health check modules 610.

Figure 7:
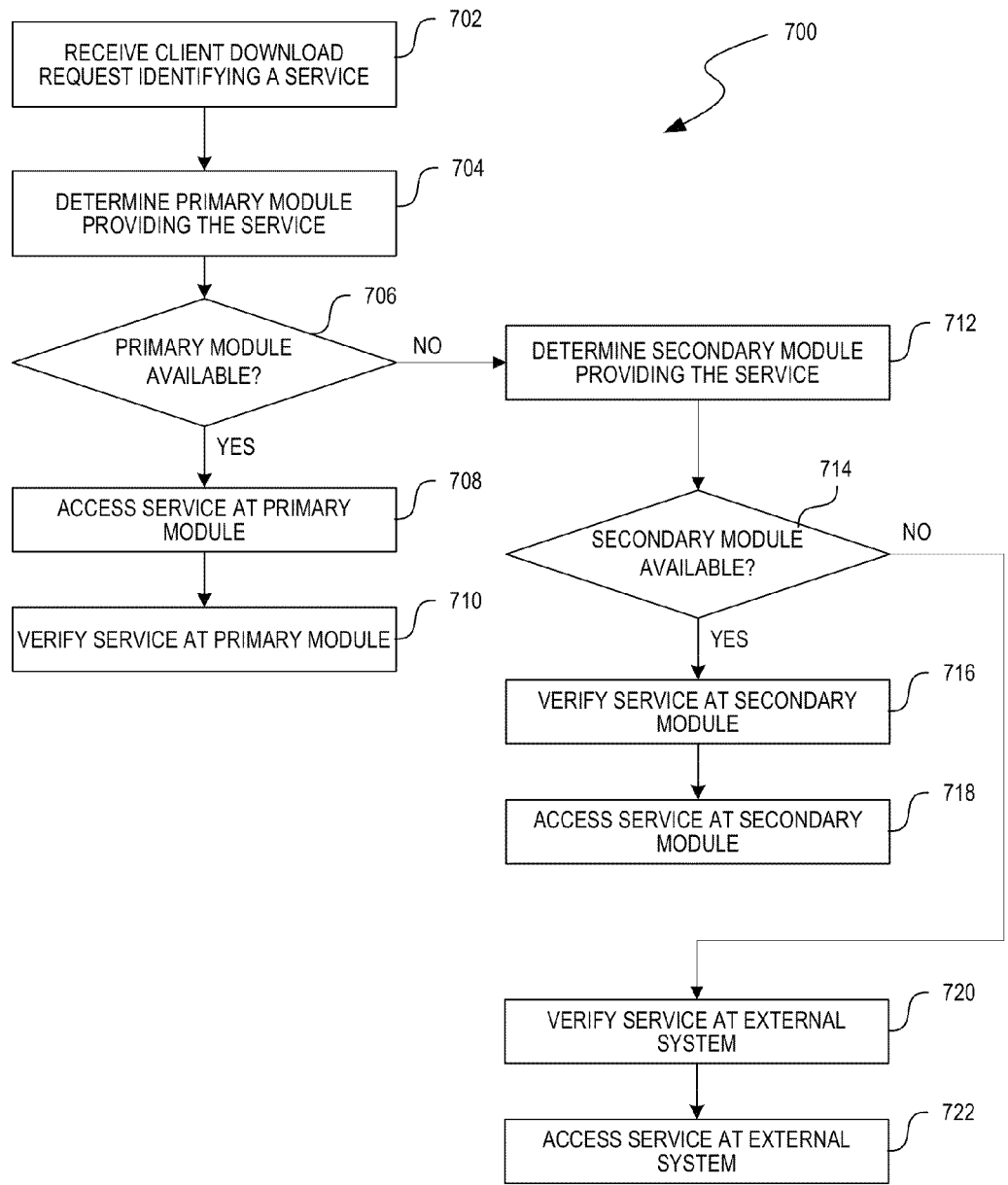
FIG. 7 depicts a flow chart illustrating an example process for downloading a data item via a host server able to interact with a health check service or monitoring system in a web-based collaboration environment.

FIG. 7 depicts a flow chart illustrating an example process 700 for downloading a file or work item via a host server that is able to interact with a health check service or monitoring system in a web-based collaboration environment, according to an embodiment. Process 700 may be performed by one or more of the host servers such as, for example, host server 105 of FIG. 1 or host server 405 of FIGS. 4A-4C.

In process 702, the host server receives a client download request or request to access (and not modify) a service. The client request can be received over a network as discussed with respect to FIG. 1. In process 704, the host server determines or identifies a primary module in the web-based collaboration environment from which to access the requested service. For example, the client request may identify a specific file to be accessed. The file can be stored on one or more modules within the web-based collaboration environment including a primary data center, a temporary node or storage server, and an external storage service such as, for example, the Amazon s3 storage service. The host server determines which modules or storage servers host the file, and then selects a module from that group of modules. The selected module is referred to herein as the primary module.

In process 706, the host server determines whether the primary module is available. For example, the host server may query a health monitoring system to determine the status of the primary module. The health monitoring system can respond to the query with an indication as to whether the primary module is available. If the primary module is available, in process 708, the host server accesses the service identified by the client request at the primary module. For example, the host server may access the file identify by the client request at a primary storage system in the data center. In process 710, the service is verified. For example, the host server may perform a check on the size of the file downloaded from the primary storage system or a checksum. If the file size matches the file size on the primary storage server then the verification is successful.

If the primary module is not available, in process 712, the host server determines if a secondary module provides the services requested by the client request. For example, a secondary storage node or server in the same data center as the primary node may have redundant access to the request service. For example, a file may be stored redundantly across a plurality of nodes in the same data center. The file may also be available from a temporary node. In process 714, the host server determines whether the secondary module is available. If the secondary module is available, in process 716, the host server accesses the service identified by the client request at the secondary module. For example, the host server may access the file identify by the client request at a secondary storage system or node in the data center. In process 718, the service is verified at the secondary storage system.

If the secondary module is not available, in process 720, the host server accesses the external module or service and, in process 722, verifies the service at the external module. It is appreciated that the secondary module does not have to be implemented. In such cases steps 712-718 can be omitted and the host system will access the external module in the event that the primary module is unavailable.

Figure 8:
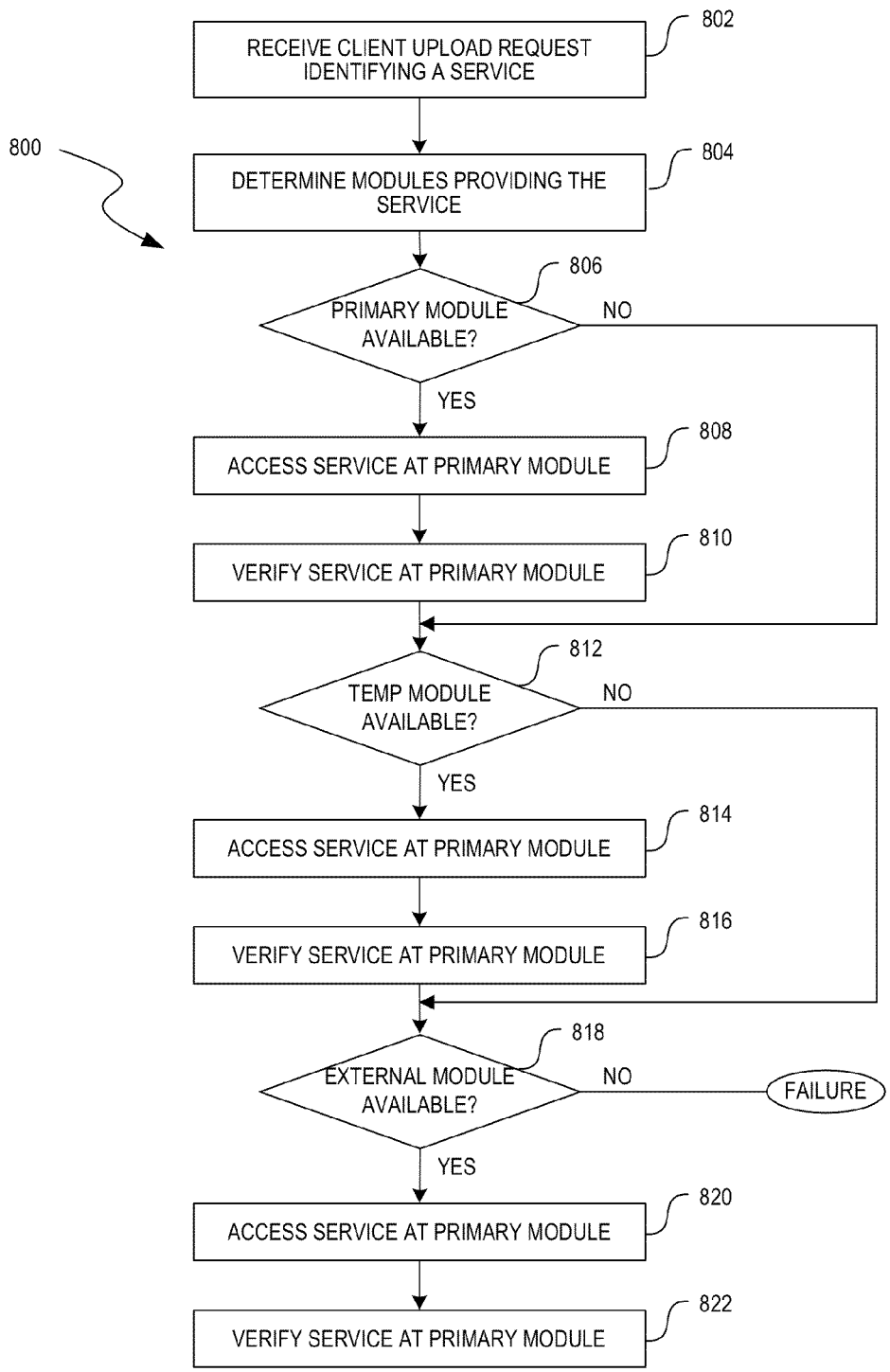
FIG. 8 depicts a flow chart illustrating an example process for uploading a data item via a host server able to interact with a health check service or monitoring system in a web-based collaboration environment.

FIG. 8 depicts a flow chart illustrating an example process 800 for uploading a file or work items via a host server that is able to interact with a health check service or monitoring system in a web-based collaboration environment, according to an embodiment. Process 800 may be performed by one or more of the host servers such as, for example, host server 105 of FIG. 1 or host server 405 of FIGS. 4A-4C.

Process 800, and in particular processes 802-822, is similar to process 700 of FIG. 7 with the exception that an upload request is received as opposed to a download request. In the case of uploads, multiple modules or storage server (nodes) must be selected for redundancy and backup purposes. The host server works in conjunction with the health monitoring server to ensure that the selected modules are available.

Figure 9:
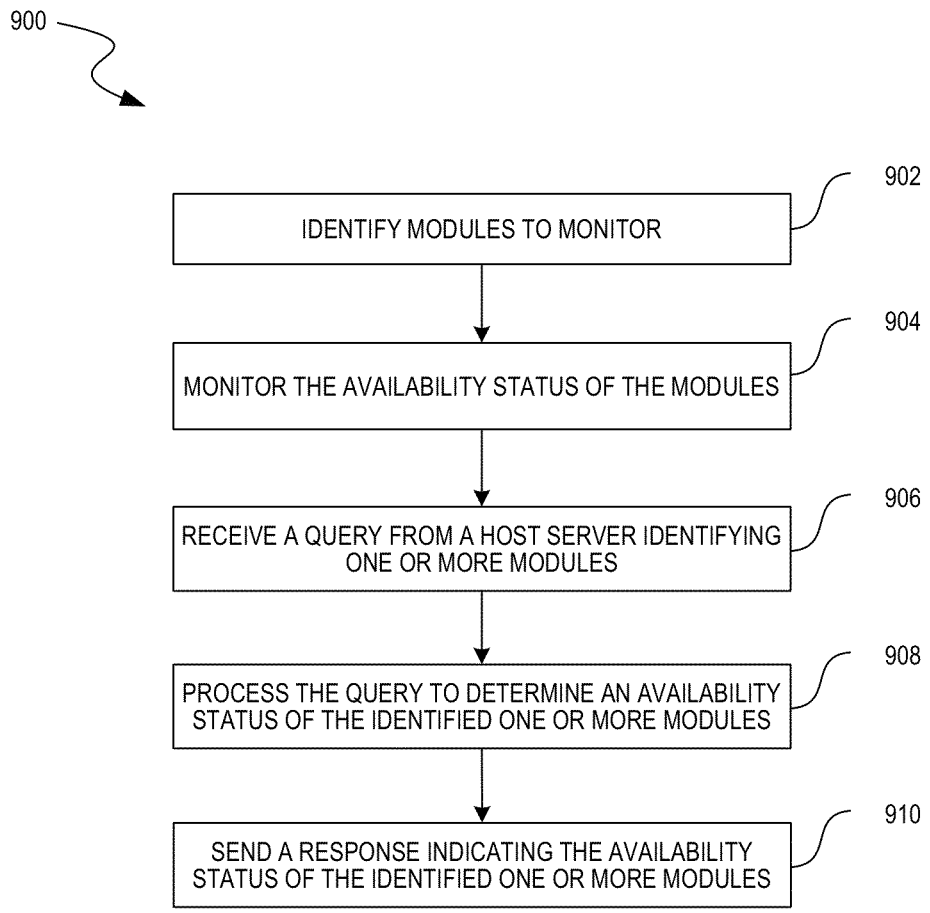
FIG. 9 depicts a flow chart illustrating an example process for monitoring the health of one or more modules or systems in a web-based collaboration environment and interacting with one or more host servers.

FIG. 9 depicts a flow chart illustrating an example process 900 for monitoring the health of one or more modules or systems in a web-based collaboration environment and interacting with one or more host servers, according to an embodiment. Process 900 may be performed by a health monitoring system such as, for example, health monitoring system 120 of FIG. 1 or health monitoring system 420 of FIG. 4.

In process 902, the health monitoring system identifies a plurality of modules to monitor in a web-based collaboration environment. In one embodiment, the modules are identified based on configuration settings and/or administer intervention. However, in some embodiments, the health monitoring system may proactively discover and identify modules in the collaboration environment to monitor.

In process 904, the health monitoring system monitors the availability status of the modules. This process is discussed in greater detail with respect to FIG. 10. However, it is appreciated that the rate at which the health monitoring system monitors the modules is less than the rate at which the health monitoring system receives queries from the host or front-end server. For example, the host or front-end server may receive fifty or more client requests every second and query the health monitoring system for the status of selected modules. However, the health monitoring system may only monitor the status of each of the modules in the web-based collaboration environment every 1-2 seconds.

In process 906, the health monitoring system receives a query from a host or front-end server identifying one or more of the modules. In process 908, the health monitoring system processes the query to determine an availability status of the identified one or more modules. In one embodiment, the health monitoring system keeps a list or a database that includes the current state or availability status of each of the modules that it is monitoring. The health monitoring system accesses this list or database to determine whether the identified one or more modules are available. Lastly, in process 910, the health monitoring system sends a response to the host system indicating the availability status of the one or more identified modules. Advantageously, the monitoring of the modules is bifurcated from the host or front-end server to offload the monitoring burden.

Figure 10:
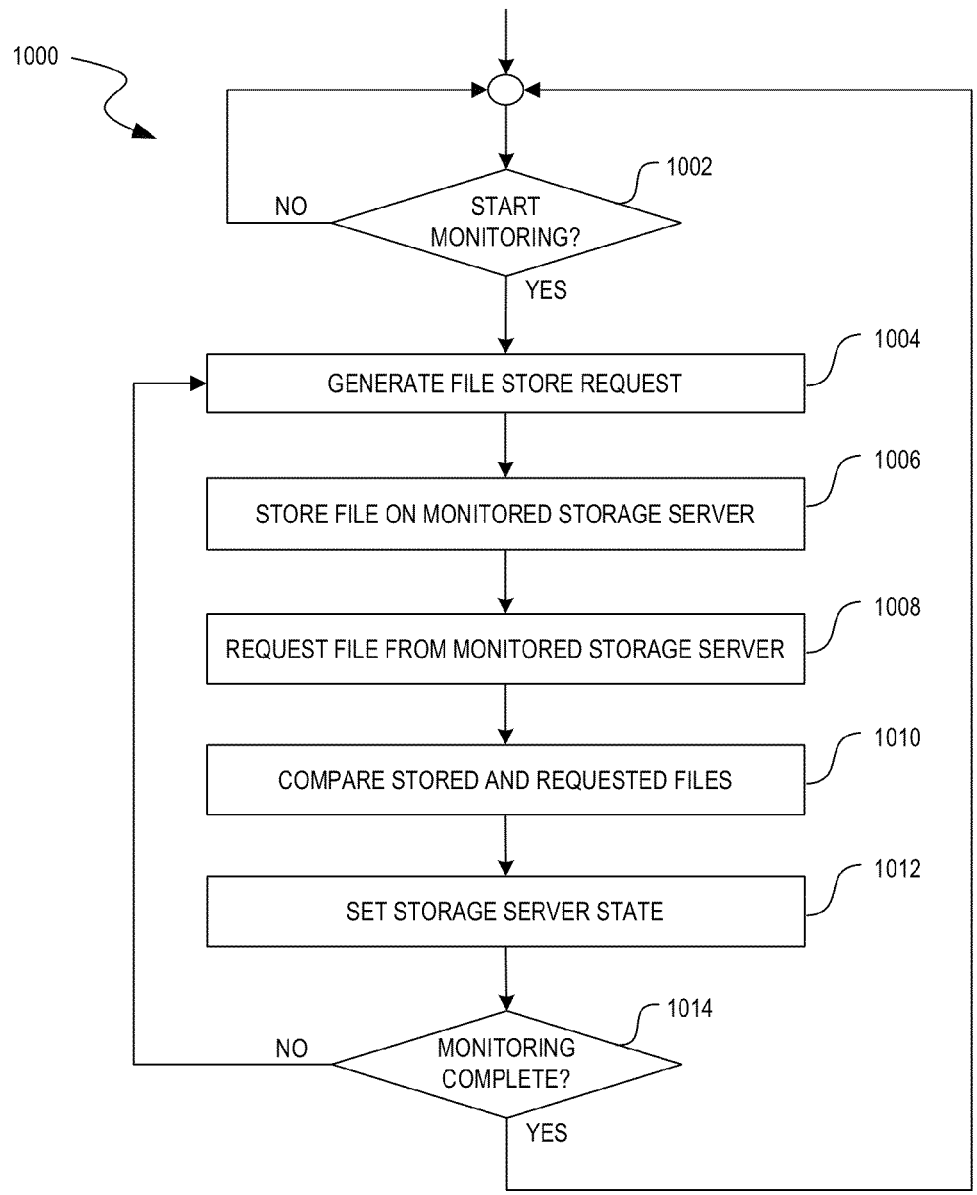
FIG. 10 depicts a flow chart illustrating a more detailed example process for monitoring the health of one or more modules or systems in a web-based collaboration environment.

FIG. 10 depicts a flow chart illustrating a more detailed example process 1000 for monitoring the health of one or more modules or systems in a web-based collaboration environment. Process 1000 may be performed by a health monitoring system such as, for example, health monitoring system 120 of FIG. 1 or health monitoring system 420 of FIG. 4.

In process 1002, the health monitoring system determines whether it should monitor the current state of the modules in the web-based collaboration environment. As discussed, the health monitoring system may monitor the modules every 1-2 seconds. For example, the health monitoring system may include one or more timers that notify the health monitoring system to commence the monitoring processes.

In process 1004, the health monitoring system generates a file store request. For example, the health monitoring system may generate a random or faux file and, in process 1006, store the file on a selected module or storage server. In process 1008, the health monitoring system requests the file from the selected storage system and, in process 1010, the health monitoring system compares the stored and the requested files. In one embodiment, the health monitoring system may perform a checksum or check the size of the requested file to ensure that the storage server or node is working properly. In some cases, the health monitoring system may also not the response time.

In process 1014, the health monitoring system sets the state of the storage server or node (or any module). If, for example, the request to download the random file exceeded a threshold in process 1010 then the health monitoring system may deem the storage server "OFF." Alternatively, if the availability status is kept numerically (e.g., on a scale 0-5), the health monitoring system may assign the storage server or module a lesser than perfect numerical availability status if the file is received properly but the response time exceeds one or more thresholds.

Figure 11:
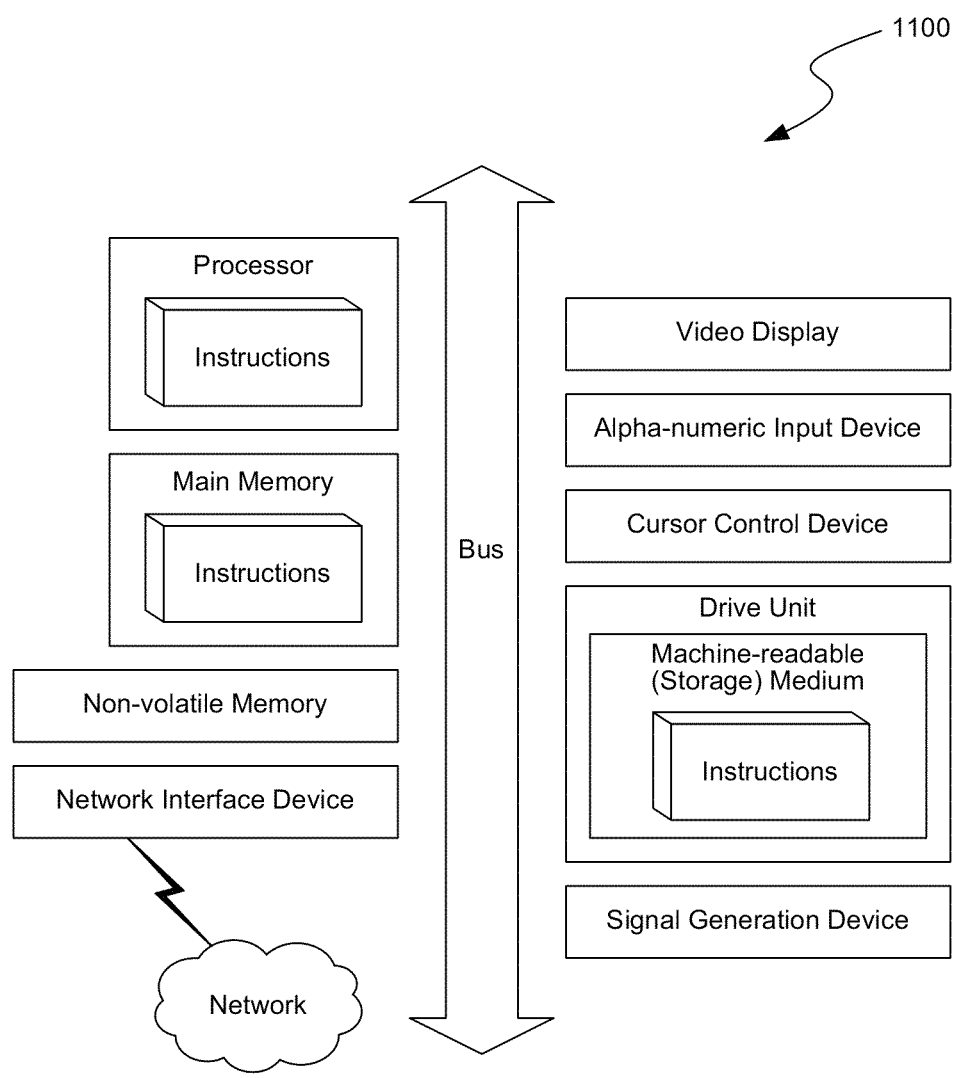
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation 1100 of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for monitoring availability status of a plurality of modules in a web-based collaboration environment, the method comprising:

identifying, at a health monitoring system, the plurality of modules, wherein each module provides one or more services to clients via one or more host servers, and the one or more services are redundantly accessible from more than one of the plurality of modules;

monitoring, at the health monitoring system, the availability status of the plurality of modules;

receiving, at the health monitoring system, a query from a first host server of the one or more host servers, the query identifying a first module of the plurality of modules;

processing, at the health monitoring system, the query to determine a first availability status associated with the first module based on said monitoring; and sending, from the health monitoring system, a response for delivery to the first host server, the response indicating the first availability status.

2. The method of claim 1, wherein the plurality modules comprise storage servers and the one or more services comprise storage services.

3. The method of claim 2, wherein the plurality of modules include an internal storage system and an external storage service.

4. The method of claim 3, wherein the plurality of modules further include a temporary storage module.

5. The method of claim 1, wherein said monitoring is performed periodically.

6. The method of claim 1, wherein said monitoring is performed every one to two seconds.

7. The method of claim 1, wherein the health monitoring system comprises a plurality of redundantly distributed health monitoring modules.

8. The method of claim 7, wherein said processing further comprises:
identifying, at the health monitoring system, a leader from the plurality of redundantly distributed health monitoring modules, wherein the leader determines the first availability status.

9. The method of claim 7, wherein said processing further comprises:
identifying, at the health monitoring system, a quorum from the plurality of redundantly distributed health monitoring modules, wherein the quorum determines the first availability status.

10. The method of claim 1, wherein said monitoring further comprises:
generating, at the health monitoring system, one or more requests to store a data item on one or more of the plurality of modules;
sending, at the health monitoring system, the one or more store requests to the plurality of modules;
requesting, at the health monitoring system, the data item from the one or more of the plurality of modules;
receiving, at the health monitoring system, the data item from the one or more of the plurality of modules;
verifying, at the health monitoring system, the data item to determine availability status of the plurality of modules; and
storing the availability status of the plurality of modules in a memory system.

11. The method of claim 10, wherein verifying the data item comprises performing a checksum on the data item.

12. The method of claim 10, wherein the verifying the data item comprises verifying the size of the data item.

13. The method of claim 10, wherein the availability status of the plurality of modules is represented as one of an ON state or OFF state.

14. The method of claim 10 further comprising:
determining, at the health monitoring system, a latency in receiving the data item from the one or more of the plurality of modules.

15. The method of claim 14, wherein the availability status of the plurality of modules is represented numerically based on the latency in receiving the data item from the one or more of the plurality of modules.

16. A system for monitoring availability status of a plurality of modules in a web-based collaboration environment, the system comprising:
a processing unit;
a memory unit having stored thereon instructions which when executed by the processing unit, cause the processing unit to:
identify the plurality of modules, wherein each module provides one or more services to clients via one or more host servers and the one or more services are redundantly accessible from more than one of the plurality of modules;
monitor the availability status of the plurality of modules;
receive a query from a first host server of the one or more host servers, the query identifying a first module of the plurality of modules;
process the query to determine a first availability status associated with the first module based on said monitoring; and
send a response indicating the first availability status.

17. The system of claim 16, wherein, the instructions, when executed by the processing unit, further cause the processing unit to:
generate one or more requests to store a data item on one or more of the plurality of modules;
send the one or more store requests to the plurality of modules;
request the data item from the one or more of the plurality of modules;
receive the data item from the one or more of the plurality of modules; and
verify the data item to determine availability status of the plurality of modules.

18. The system of claim 17, wherein to verify the data item, the instructions, when executed by the processing unit, cause the processing unit to perform a checksum on the data item.

19. The system of claim 17, wherein to verify the data item, the instructions, when executed by the processing unit, cause the processing unit to verify the size of the data item.

20. The system of claim 17, wherein the availability status of the plurality of modules is represented as one of an ON state or OFF state.

21. The system of claim 17, wherein, the instructions, when executed by the processing unit, further cause the processing unit to:
determine a latency in receiving the data item from the one or more of the plurality of modules;
wherein the availability status of the plurality of modules is represented numerically based on the latency in receiving the data item from the one or more of the plurality of modules.

22. A system comprising:
one or more host servers configured to receive client requests, process the client requests to determine one or more data items, select one or more modules having the one or more data items stored thereon, and responsively transfer one or more queries requesting availability of the one or more modules; and
one or more health monitoring servers configured to receive the one or more queries, identify the availability of the one or more modules, and send one or more responses to the one or more queries indicating the availability of the one or more modules, wherein the one or more health monitoring servers are further configured to periodically determine the availability status of the one or more modules.

23. The system of claim 22 wherein to determine the availability status of the one or more modules, the one or more health monitoring servers are further configured to generate one or more requests to store a data item on one or more of the plurality of modules, send the one or more store requests to the plurality of modules, request the data item from the one or more of the plurality of modules, receive the data item from the one or more of the plurality of modules, and verify the data item.

24. The system of claim 23 wherein to verify the data item, the one or more host servers are further configured to verify the size of the data item or perform a checksum on the data item.

25. A machine-readable storage medium having stored thereon instructions which when executed by a processor performs a method for monitoring availability status of a plurality of modules in a web-based collaboration environment, the method comprising:
   identifying the plurality of modules, wherein each module provides one or more services to clients via one or more host servers, and the one or more services are redundantly accessible from more than one of the plurality of modules;
   monitoring the availability status of the plurality of modules;
   receiving a query from a first access server of the one or more host servers, the query identifying a first module of the plurality of modules;
   processing the query to determine a first availability status associated with the first module based on said monitoring; and
   sending a response for delivery to the first host server, the response indicating the first availability status.

26. A non-transitory computer readable storage medium having instructions stored thereon which, when executed by one or more processors of a health monitoring system, cause the health monitoring system to:
   identify a plurality of modules in a web-based collaboration environment, wherein each module provides one or more services to clients via one or more host servers, and the one or more services are redundantly accessible from more than one of the plurality of modules;
   monitor an availability status of the plurality of modules;
   receive a query from a first host server of the one or more host servers, the query identifying a first module of the plurality of modules;
   process the query to determine a first availability status associated with the first module based on said monitoring; and
   send a response for delivery to the first host server, the response indicating the first availability status.

27. The non-transitory computer readable storage medium of claim 26, wherein the plurality modules comprise storage servers and the one or more services comprise storage services.

28. The non-transitory computer readable storage medium of claim 26, wherein the health monitoring system comprises a plurality of redundantly distributed health monitoring modules.

* * * * *